(12) United States Patent
Hayashi

(10) Patent No.: US 9,137,721 B2
(45) Date of Patent: *Sep. 15, 2015

(54) MOBILE COMMUNICATION SYSTEM, RADIO BASE STATION CONTROLLER, AND RELOCATION METHOD

(71) Applicant: NEC CORPORATION, Tokyo (JP)

(72) Inventor: Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 14/107,433

(22) Filed: Dec. 16, 2013

(65) Prior Publication Data

US 2014/0105177 A1 Apr. 17, 2014

Related U.S. Application Data

(63) Continuation of application No. 13/340,878, filed on Dec. 30, 2011, now Pat. No. 8,670,370, which is a continuation of application No. 12/278,527, filed on Aug. 6, 2008, now Pat. No. 8,422,456.

(30) Foreign Application Priority Data

Feb. 7, 2006 (JP) .................................. 2006-029666

(51) Int. Cl.
*H04W 36/08* (2009.01)
*H04W 36/10* (2009.01)

(52) U.S. Cl.
CPC .............. *H04W 36/08* (2013.01); *H04W 36/10* (2013.01)

(58) Field of Classification Search
CPC ..... H04W 36/08; H04W 40/00; H04W 52/40; H04W 23/04; H04B 7/14; H04L 47/11
See application file for complete search history.

(56) References Cited

U.S. PATENT DOCUMENTS 6,466,556 B1 10/2002 Boudreaux
6,826,193 B1 11/2004 Peisa
(Continued)

FOREIGN PATENT DOCUMENTS

CN 1209008 A 2/1999
CN 1299210 A 6/2001
(Continued)

OTHER PUBLICATIONS

EUTRAN handover procedure for LTE_Active, NEC, NTT DoCoMo, Oct. 11-14, 2005, 3 total pages, Joint RAN2-RAN3 No. 48bis LTE, Cannes, France.

(Continued)

*Primary Examiner* — Anez Ebrahim
(74) *Attorney, Agent, or Firm* — Sughrue Mion, PLLC

(57) ABSTRACT

Radio base stations connect by radio lines with radio terminals in cells that make up each radio base station and relay data communication realized by the radio terminals on bearers on radio lines. Base station controllers record correspondence information of the data flow of data communication with the radio terminals and the bearers on the radio lines and, by referring to the correspondence information, effects termination of data communication with the radio terminals. When, in a state in which a drift base station controller relays and transfers data communication between radio base stations to which the radio terminals are connected and a serving base station controller, the serving base station controller is transferred to the drift base station controller, the plurality of base station controllers then report to the drift base station controller the correspondence information from the serving base station controller.

8 Claims, 11 Drawing Sheets

(56) References Cited

U.S. PATENT DOCUMENTS

| | | |
|---|---|---|
| 6,909,895 B2 | 6/2005 | Einola et al. |
| 7,286,563 B2 | 10/2007 | Chang et al. |
| 7,948,936 B2 | 5/2011 | Lohr et al. |
| 2002/0025815 A1 | 2/2002 | Rune et al. |
| 2002/0082014 A1 | 6/2002 | Andersson et al. |
| 2002/0091860 A1 | 7/2002 | Kalliokulju et al. |
| 2002/0107019 A1 | 8/2002 | Mikola et al. |
| 2003/0117980 A1 | 6/2003 | Kim et al. |
| 2003/0147371 A1 | 8/2003 | Choi et al. |
| 2003/0210676 A1 | 11/2003 | Wu |
| 2004/0001472 A1 | 1/2004 | Kwak et al. |
| 2004/0085926 A1 | 5/2004 | Hwang et al. |
| 2004/0117860 A1 | 6/2004 | Yi et al. |
| 2004/0137876 A1 | 7/2004 | Fischer et al. |
| 2004/0208160 A1 | 10/2004 | Petrovic et al. |
| 2006/0007886 A1 | 1/2006 | Lee et al. |
| 2006/0039326 A1 | 2/2006 | Jeong et al. |

FOREIGN PATENT DOCUMENTS

| | | |
|---|---|---|
| CN | 1383295 A | 12/2002 |
| EP | 1519519 A1 | 3/2005 |
| EP | 1523134 A1 | 4/2005 |
| EP | 1583292 A1 | 10/2005 |
| EP | 1592275 A1 | 11/2005 |
| JP | 2004-108743 | 11/2004 |
| WO | 9849785 A1 | 11/1998 |
| WO | 99/51051 A2 | 10/1999 |
| WO | 01/39534 A1 | 5/2001 |
| WO | 01/76282 A2 | 10/2001 |
| WO | 03/087978 A2 | 10/2003 |
| WO | 03/088695 A1 | 10/2003 |
| WO | 2004084574 A2 | 9/2004 |

OTHER PUBLICATIONS

R3-041729, Changes for Introducing E-DCH, Siemens, Nov. 15-18, 2004, 304 total pages, 3GPP TSG-RAN WG3 Meeting No. 45, Shin-Yokohama, Japan.

R3-051386, 14 total pages, Nov. 7-Nov. 11, 2005, 3GPP TSG-RAN3 Meeting No. 49, Seoul, Republic of Korea.

R5-051233, MAC test cases for FDD Enhanced Uplink, Ericsson, Motorola, NEC, 5 total pages, Aug. 22-26, 2005, 3GPP TSG RAN5 Meeting No. 27, Berlin, Germany.

R3-050701, 18 total pages, May 9-15, 2005, 3GPP TSG-RAN WG3 Meeting No. 47, Athens, Greece.

R3-060028, Forwarding Mechanism for Intra-Access System Handover, Alcatel, 4 total pages, Jan. 10-12, 2006, 3GPP TSG-RAN WG 3 Meeting No. 50, Sophia-Antipolis, France.

Office Action dated Dec. 11, 2013, issued by the State Intellectual Property Office of the P.R.C. in corresponding Chinese Application No. 201210019764.6.

http://www.3gpp.org, "3rd Generation Partnership Project; Technical Specification Group Radio Access Network; Typical examples of Radio Access Bearers (RBAs) and Radio Bearers (RBs) supported by Universal Terrestrial Radio Access (UTRA)", (Release 6), 3GPP TR 25.993 V6.12.0, p. 1-163, (Dec. 2005).

http://www.3gpp.org, "3rd Generation Partnership Project; Technical Specification Group Radio Access Network; Technical Specification Group Radio Access Network; UTRAN Iu interface RANAP signalling", (Release 6), 3GPP TS 25.413 V6.8.0, p. 1-331, (Dec. 2005).

http://www.3gpp.org, "3rd Generation Partnership Project; Technical Specification Group Radio Access Network; FDD Enhanced Uplink Overall description; Stage 2", (Release 6), 3GPP TS 25.309 V6.5.0, p. 1-34, (Dec. 2005).

http://www.3gpp.org, "3rd Generation Partnership Project; Technical Specification Group Radio Access Network; Technical Specification Group Radio Access Network; High Speed Downlink Packet Access (HSDPA); Overall description; Stage 2", (Release 6), 3GPP TS 25.308 V6.3.0, p. 1-28, (Dec. 2004).

http://www.3gpp.org, "6.9.2.2 Serving RNS Relocation Procedures", (Release 6), 3GPP TS 23.060 V6.11.0, p. 77-94, (Dec. 2005).

http://www.3gpp.org, "5.2 RRC Services provided to upper layers", (Release 6), 3GPP TS 25.331 V6.8.0, p. 40-41, (Dec. 2005).

3GPP TS 25.413 V6.8.0 (Dec. 2005), Dec. 2005, pp. 152-156.

NEC, Adding the SRB-ID and HS-DSCH/E-DCH MAC-d flow ID mapping info, 3GPP TSG-RAN WG3 Meeting #51 Tdoc R3-060110, Feb. 13, 2006, total 13 pages.

Nokia, SRB mapping toward HS-DSCH and E-DCH MAC-d flows, 3GPP TSG-RAN WG3 Meeting #51 Tdoc R3-060241, Feb. 13, 2006, total 14 pages.

Final Office Action dated Feb. 2, 2012 issued in U.S. Appl. No. 12/278,527.

Notice of Allowance issued Sep. 18, 2013 in Parent U.S. Appl. No. 13/340,878.

Non-final Office Action issued Feb. 20, 2013 in Parent U.S. Appl. No. 13/340,878.

Fig. 12

| IE Name (Information Element Name) | Presence (Mandatory or Optional) | Renge (Value Range) | IE Type (Information Element Type) | Semantics Description (Recitals) |
|---|---|---|---|---|
| SRB TrCH Mapping | — | 1to <max noofSRBs> | — | — |
| >SRB ID | Mandatory | — | INTEGER (1..32) | The SRB ID is the absolute value of the SRB. |
| >HS-DSCH MAC-d Flow ID | Option | — | INTEGER (0..7) | The HS-DSCH MAC-d Flow ID is the identifier of an HS-DSCH MAC-d flow over Iur. |
| >E-DCH MAC-d Flow ID | Option | — | INTEGER (0..7) | The E-DCH MAC-d Flow ID is the identifier of an E-DCH MAC-d flow over Iur. |

MOBILE COMMUNICATION SYSTEM, RADIO BASE STATION CONTROLLER, AND RELOCATION METHOD

This application is a Continuation of application Ser. No. 13/340,878, filed Dec. 30, 2011, which is a Continuation Application of application Ser. No. 12/278,527 filed Aug. 6, 2008, which is based on Japanese Patent Application No. 2006-029666 filed on Feb. 7, 2006, the disclosures of which are incorporated herein by reference in their entirety.

TECHNICAL FIELD

The present invention relates to high-speed data transfer in a mobile communication system, and more particularly, relates to the control of a data transfer path according to the movement of a radio terminal.

BACKGROUND ART

In the 3GPP (3rd Generation Partnership Project), high-speed downlink data transfer in a WCDMA (Wideband Code-Division Multiple Access) mobile communication system is realized by HSDPA (High-Speed Downlink Packet Access) and high-speed uplink data transfer is realized by E-DCH (Enhanced Dedicated Channel).

High-speed downlink packet access is normally referred to as "HSDPA." In HSDPA, a radio base station (hereinbelow referred to as "Node-B") generates a radio physical channel referred to as an HS-DSCH (High-Speed Downlink Shared Channel) and loads downlink data or control signals on this HS-DSCH to transmit to a radio terminal (hereinbelow referred to as "UE (User Equipment))."

In HSDPA, a plurality of UEs share the use of one or a plurality of codes, and HSDPA therefore has the advantages not only enabling the realization of high-speed data transfer but also of economizing radio code resources compared to a case in which one UE has exclusive use of one or a plurality of radio codes.

By means of HSDPA, data flow referred to as HS-DSCH MAC (Medium Access Control)-d flow is transferred in a network from a MAC-d entity in a radio base station controller (hereinbelow referred to as "RNC (Radio Network Controller)") to a MAC-hs (Medium Access Control-high-speed) entity in Node-B. Here, data flow refers to the flow of data transferred over a prescribed path.

FIG. 1 shows an example of data transfer by HSDPA in a mobile communication system. In the example of FIG. 1, a serving RNC and a drift RNC are generated by the movement of UE. HS-DSCH MAC-d flow is then transferred from the MAC-d entity of the serving RNC via the drift RNC to the MAC-hs entity in Node-B that is under the control of the drift RNC.

In this case, the drift RNC only provides a transport bearer for the Iur interface and Iub interface for transfer as simple data flow without any awareness of the content of the HS-DSCH MAC-d flow.

FIG. 2 is a view for explaining an example of communication that uses HSDPA.

As shown in FIG. 2, one example of communication that uses HSDPA is the transfer of control signals of RRC (Radio Resource Control) protocol or a NAS(Non-Access Stratum) by an SRB (Signaling Radio Bearer; see 3GPP TS 25.331V6.8.0 (2005-12), Radio Resource Control (RRC) Protocol Specification, Release 6, pp. 40-41 (6.3 Signaling Radio Bearers)). NAS is control protocol between a UE and a CN (Core Network) and is not interpreted by an RNC.

A MAC-d entity on an RNC is made up from UE units. A MAC-hs entity on Node-B is constructed for each cell. A MAC-d entity multiplexes the SRB relating to the corresponding UE with the HS-DSCH MAC-d and transmits to the MAC-hs entity at Node-B. The MAC-hs entity multiplexes the HS-DSCH MAC-d flow on the HS-DSCH and transmits wirelessly.

By using HSDPA, an RNC can transmit control signals realized by HS-DSCH to a UE via Node-B. The advantage of this type of communication is that, because radio codes are shared among a plurality of UE, radio code resources can be economized.

In communication that uses this type of HSDPA, an RNC places SRB that is applied as input to a MAC-d entity in correspondence with the HS-DSCH MAC-d flow that is supplied from a MAC-d entity. For this purpose, the RNC saves information regarding the correspondence between an SRB ID and an HS-DSCH MAC-d flow ID. The RNC then uses this correspondence information to identify which SRB is to be transferred by which HS-DSCH MAC-d flow.

The MAC-hs entity at Node-B then identifies data that have been transferred in from the RNC by using the ID of the HS-DSCH MAC-d flow that transfers these data. For example, if the HS-DSCH MAC-d flow ID is a prescribed value, the MAC-hs entity can recognize the data transferred from the RNC as RRC protocol control signals.

In FIG. 2, for example, it is assumed that SRB1 is an RRC protocol control signal, SRB2 is an NAS call connection signal, and SRB3 is an NAS short message. A MAC-hs entity of Node-B can recognize the SRB by the HS-DSCH MAC-d flow ID, and in multiplex control, can preferentially multiplex the HS-DSCH MAC-d flow #1 for transferring SRB1 of RRC protocol having high importance in the HS-DSCH to the UE.

An E-DCH is also referred to as HSUPA (High-Speed Uplink Packet Access).

By means of E-DCH, data flow that is called E-DCH MAC-d flow in a network is transmitted from a MAC-e entity in Node-B to a MAC-es entity in the RNC. In the RNC, the MAC-es entity performs reordering of the E-DCH MAC-d flow and transmits the data flow that has undergone reordering to the MAC-d entity. Here, reordering is a process of viewing and rearranging the order of sequence numbers.

FIG. 3 shows data transfer by an E-DCH in a mobile communication system. In the example of FIG. 3, the serving RNC and drift RNC are generated by movement of the UE. A MAC-e entity in Node-B that is under the drift RNC then receives the data of the E-DCH from the UE, separates the E-DCH MAC-d flow from these data, and transfers the E-DCH MAC-d flow to the MAC-es entity in the serving RNC via the drift RNC. The MAC-es entity of the serving RNC performs reordering of the E-DCH MAC-d flow that has been received from the MAC-e entity in Node-B and then transmits to the MAC-d entity.

In this case as well, the drift RNC only provides a transport bearer to the Iur interface and Iub interface for transfer without awareness of the content of the E-DCH MAC-d flow.

FIG. 4 is a view for explaining an example of communication that uses an E-DCH.

As shown in FIG. 4, examples of communication that uses an E-DCH include cases of transferring RRC protocol or NAS control signals by an SRB.

The MAC-d entity on the RNC is made up from UE units as previously described. In addition, the MAC-e entity is also made up from UE units. The MAC-e entity of Node-B that has received E-DCH data from a UE separates into E-DCH MAC-d flow and transmits this to the MAC-es entity of the RNC. The MAC-es entity performs reordering of the E-DCH MAC-d flow and transmits to the MAC-d entity.

In this communication that uses an E-DCH, the RNC places in correspondence the E-DCH MAC-d flow that is applied as input to the MAC-es entity and the SRB supplied from the MAC-d entity. To this end, the RNC maintains information regarding the correspondence between SRB IDs and E-DCH MAC-d flow IDs.

By means of this correspondence information, the RNC then identifies which SRB is transferred in and by which E-DCH MAC-d flow.

In the state in which a serving RNC and drift RNC are generated as shown in FIG. 1 and FIG. 3, the data transfer path becomes long, and this gives rise to a delay in the transfer of data. In addition, a band of the circuit is allotted to transfer paths that have become longer than necessary, resulting in a state in which band resources are not efficiently used. To eliminate such states, relocation may be implemented to shorten the data transfer path and use resources efficiently (for example, refer to 3GPP TS23. 060 v6.11.0 (2005-12), General Packet Radio Service (GPRS) Service Description Stage 2, Release 6, pp. 77-94 (6.9.2.2 Serving RNC Relocation Procedures)).

FIG. 5 is a sequence chart showing the relocation operation in a mobile communication system. In the example of FIG. 5, as the initial state, the serving RNC and UE perform HSDPA and E-DCH communication via a drift RNC.

From this state, the serving RNC determines to implement relocation to, for example, optimize the path. In the relocation procedure, the serving RNC acts as the source RNC, and the drift RNC acts as the target RNC.

When the serving RNC (source RNC) transmits the message "Relocation Required" to the CN, a "Relocation Request" message is transmitted from the CN to the drift RNC (target RNC).

The drift RNC, having received the "Relocation Request" message, performs allocation of radio resources based on this message, and then returns a "Relocation Request Acknowledgement" message to the CN. The CN, having received the "Relocation Request Acknowledgement" message, transmits a "Relocation Command" message to the serving RNC.

Upon receiving the "Relocation Command" message from the CN, the serving RNC transmits a "Relocation Commit" message to the drift RNC. Upon receiving this "Relocation Commit" message, the drift RNC both transmits a "Relocation Detect" message to the CN and transmits a "UTRAN Mobility Information" message to the UE.

Upon receiving the "UTRAN Mobility Information" message, the UE returns a "UTRAN Mobility Information Response" message to the drift RNC, and the drift RNC thereupon returns a "Relocation Complete" message to the CN.

When relocation has been completed by the procedure of the above-described example, the drift RNC acts as the serving RNC and thus can communicate with the UE. Although an example has here been described in which relocation is implemented from a state in which both HSDPA and E-DCH are carried out, relocation can also be implemented from a state in which only one of the two is carried out.

DISCLOSURE OF THE INVENTION

FIG. 6 shows the state of data transfer after relocation has been carried out from the state during communication by HSDPA shown in FIG. 1. Referring to FIG. 6, this is a state in which the drift RNC acts as the serving RNC and can transmit HS-DSCH MAC-d flow directly to Node-B that is connected to the UE.

In relocation, however, there was no means in the MAC-d entity following relocation for taking over the correspondence information of the SRB ID and HS-DSCH MAC-d Flow ID that was maintained by the MAC-d entity before relocation. As a result, the RNC that had acted as the drift RNC and then due to relocation acted as the serving RNC was not able to take over the HSDPA communication mode that preceded relocation and was unable to continue the communication carried out up to that point.

In addition, FIG. 7 shows the state of data transfer after relocation has been carried out from the state during communication by E-DCH shown in FIG. 3. Referring to FIG. 7, the drift RNC acts as the serving RNC and can receive E-DCH MAC-d Flow directly from Node-B that has received data from the UE.

In relocation, however, there is again no means in the MAC-d entity for, after relocation, taking over the correspondence information of the SRB ID and the E-DCH MAC-d flow ID that was maintained by the MAC-d entity before relocation. As a result, the RNC that had acted as the drift RNC and then due to relocation acted as the serving RNC was unable to take over the E-DCH communication mode that preceded relocation and was unable to continue the communication that was carried out up to that point.

It therefore is an exemplary object of the present invention to provide a mobile communication system that, despite the implementation of relocation of a serving RNC, can continue data transfer that was realized to that point.

To achieve the above-described exemplary object, a mobile communication system of an exemplary aspect of the present invention is a mobile communication system that covers a communication area by a plurality of cells, that connects with radio terminals by switching cells, and that includes a plurality of radio base stations and a plurality of base station controllers.

The plurality of radio base stations connect by radio with radio terminals in a cell of each of radio base stations and relay by radio bearers data communication by these radio terminals.

The plurality of base station controllers record the correspondence information of the data flow of the data communication with radio terminals and the radio bearers that are used for this data communication, and terminate the data communication with radio terminals as the serving base station controllers by referring to the correspondence information. Then, in the state in which a drift base station controller relays and transfers data communication between the radio base station to which a radio terminal is connected and the serving base station controller, when a role of the serving base station controller is relocated at the drift base station controller, this serving base station controller reports the correspondence information to the drift base station controller.

BRIEF DESCRIPTION OF THE DRAWINGS

FIG. 12 is a chart showing an example of the definition of the information elements of correspondence information.

BEST MODE FOR CARRYING OUT THE INVENTION

Explanation next regards details of an example of the application in a 3GPP mobile communication system as an exemplary embodiment for working the present invention with reference to the accompanying figures.

Figure 1:
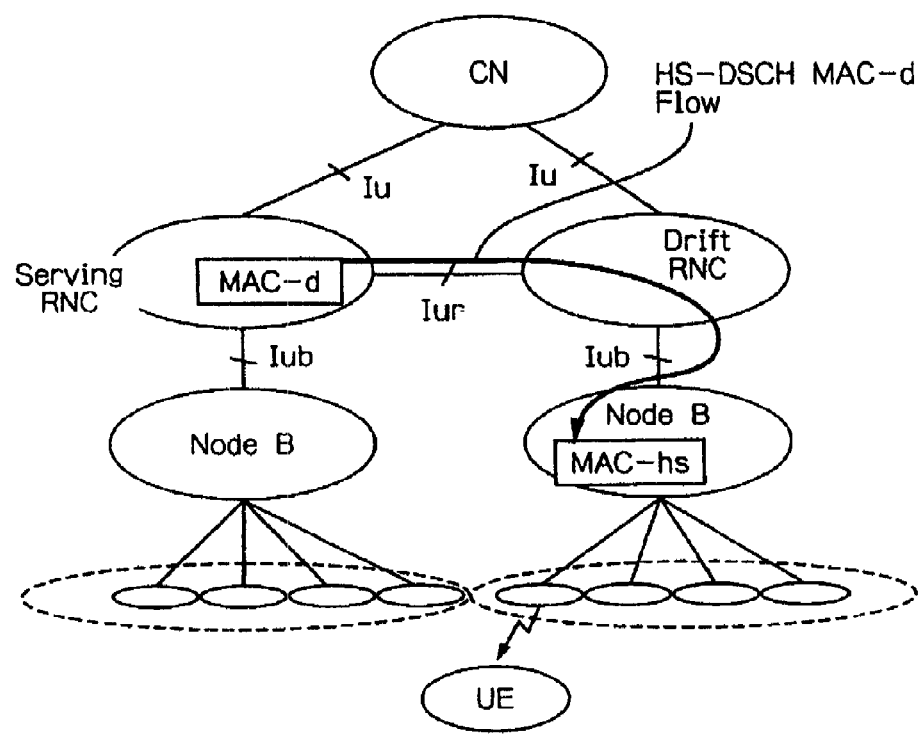
FIG. 1 shows an example of data transfer by HSDPA in a mobile communication system.
Figure 2:
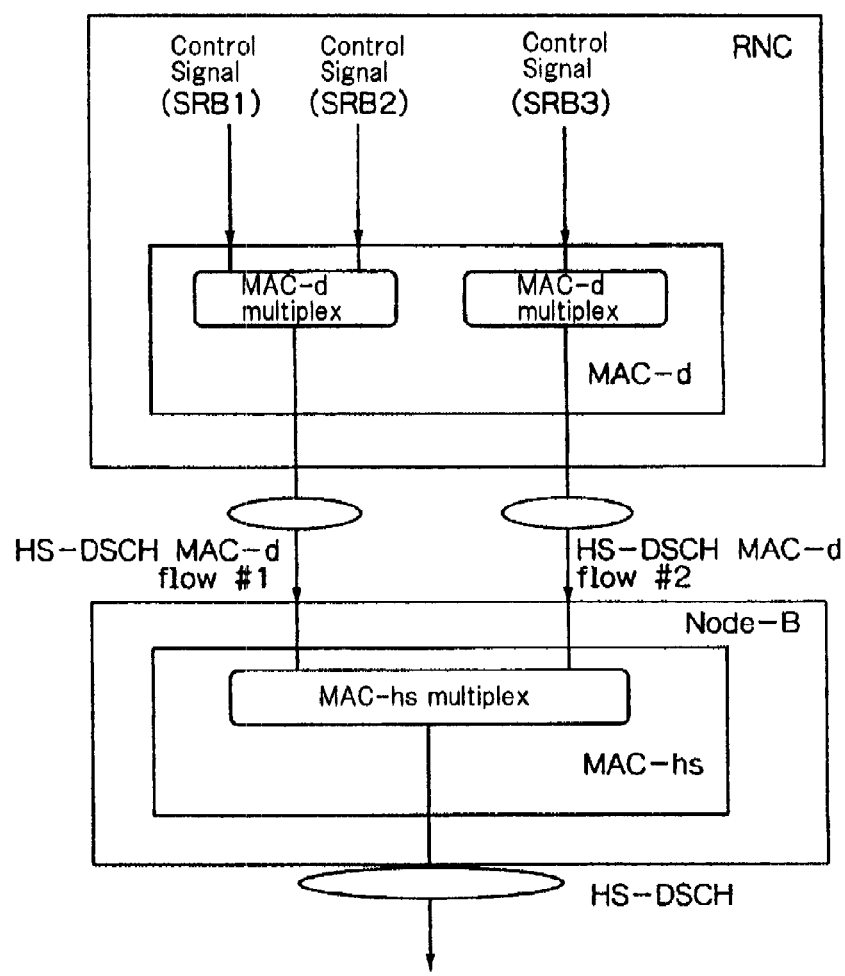
FIG. 2 is a view for explaining an example of communication that uses HSDPA.
Figure 3:
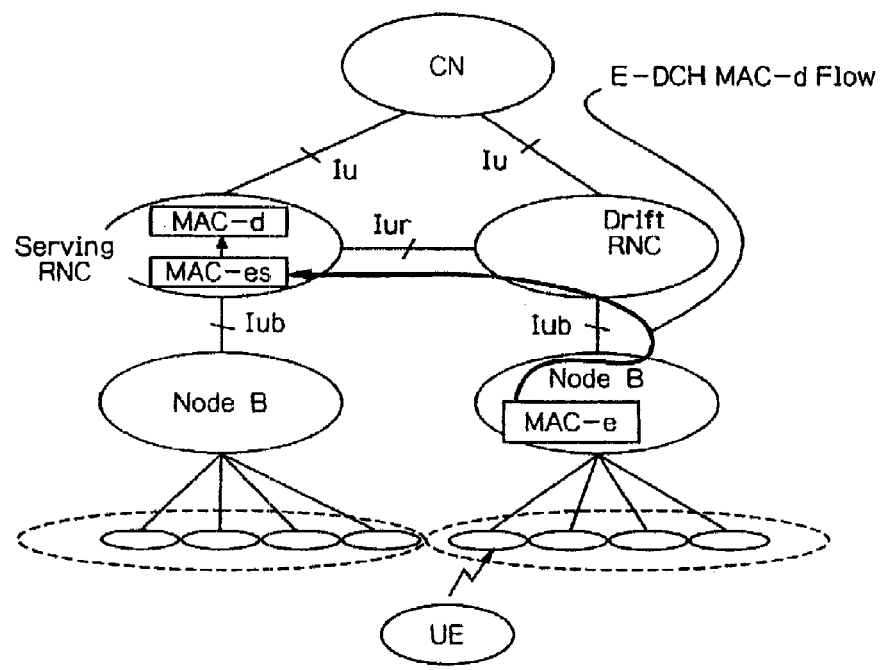
FIG. 3 shows an example of data transfer by an E-DCH in a mobile communication system.
Figure 4:
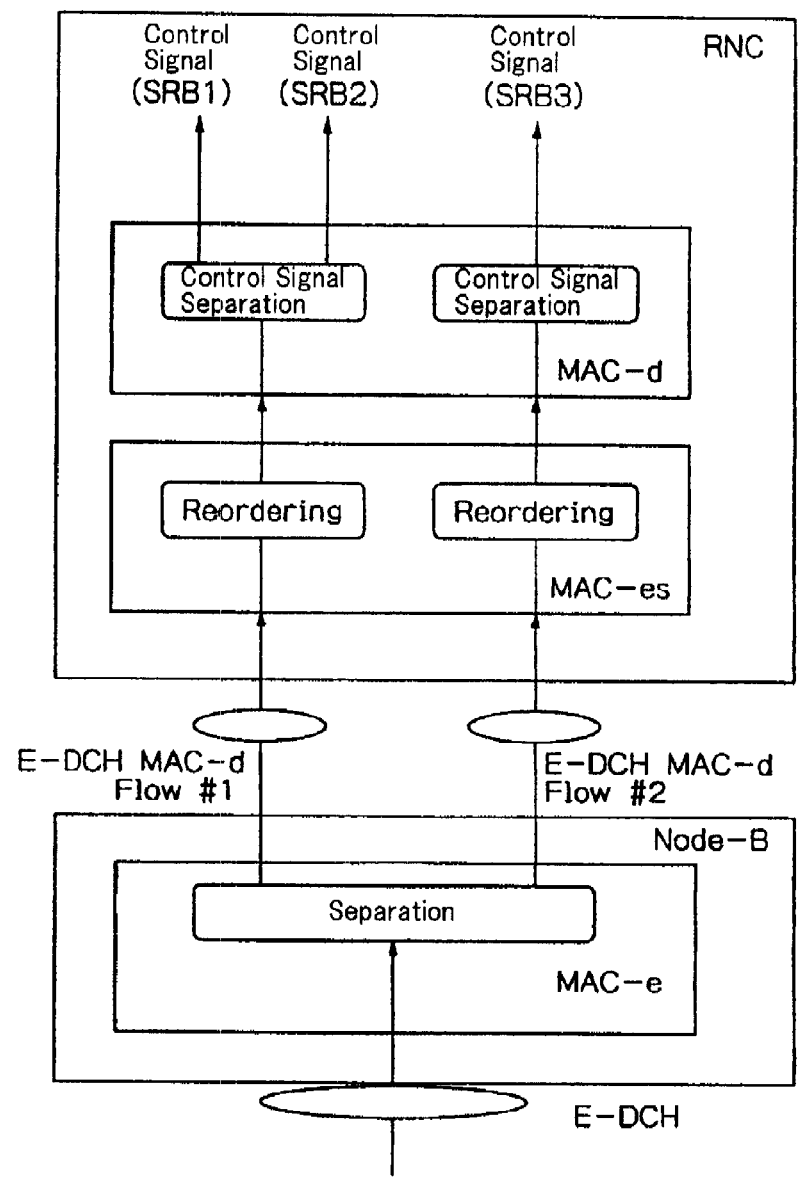
FIG. 4 is a view for explaining an example of communication using an E-DCH.
Figure 5:
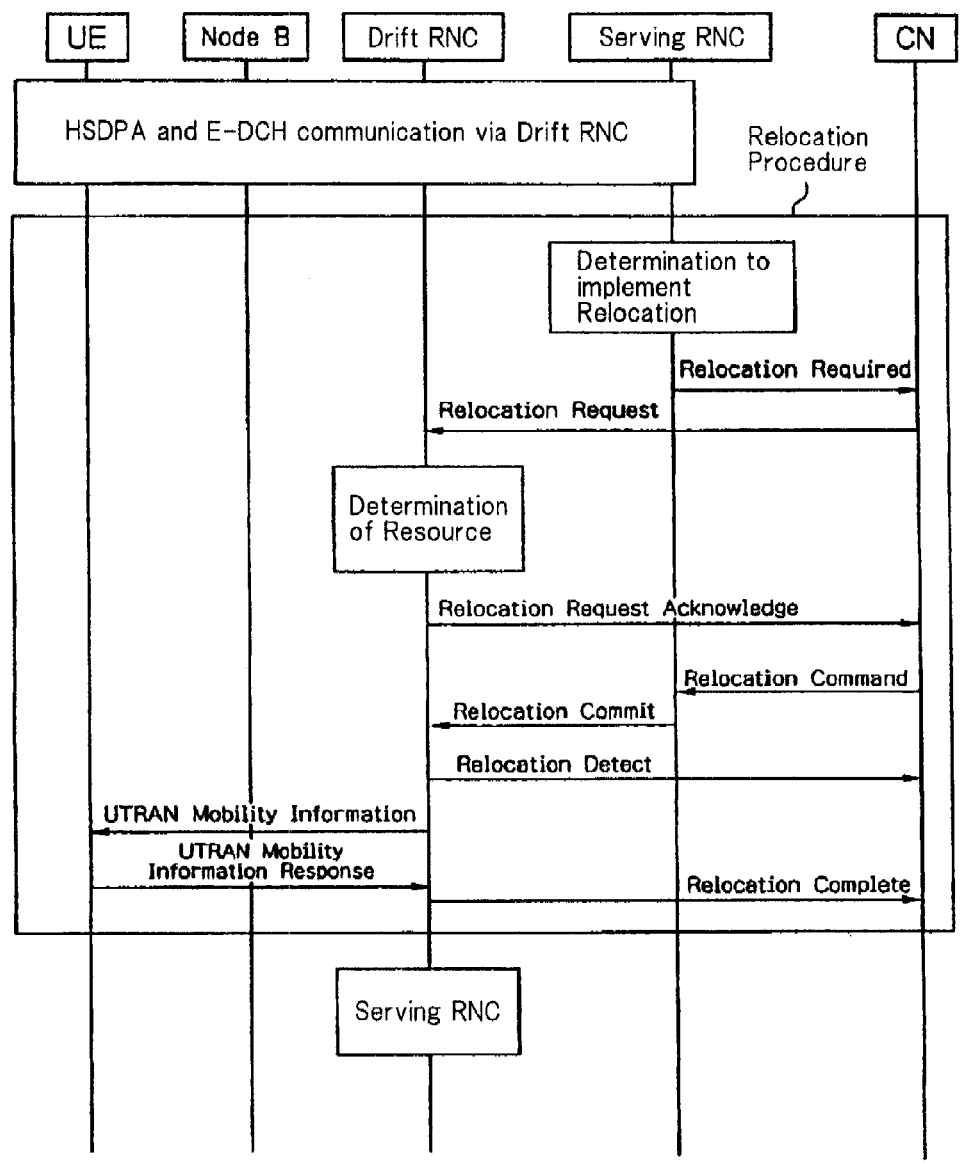
FIG. 5 is a sequence chart showing the operations of relocation in a mobile communication system.
Figure 6:
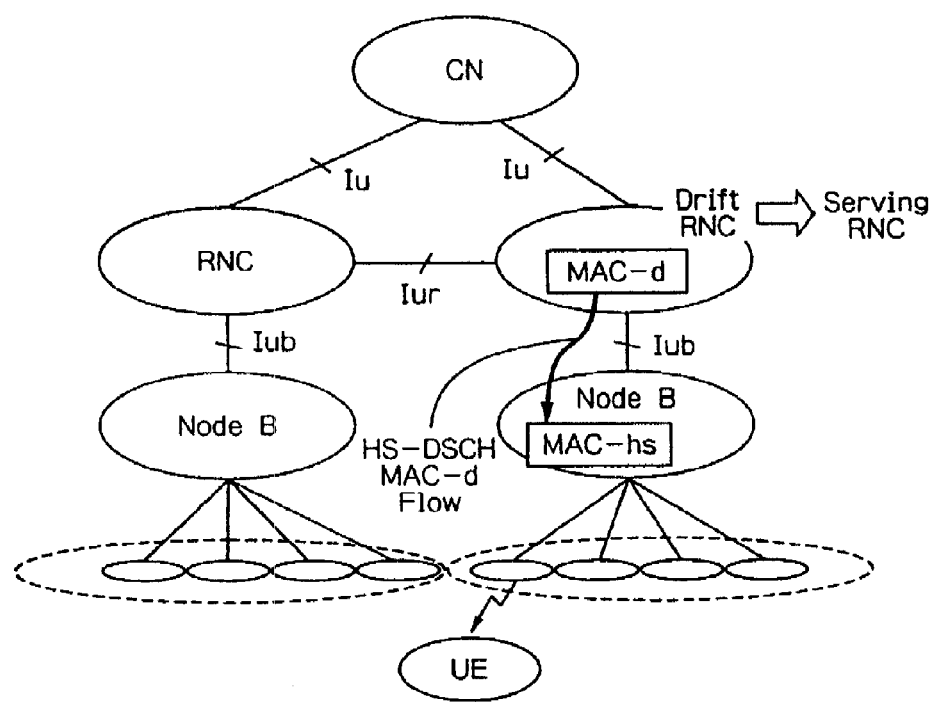
FIG. 6 shows data transfer following the implementation of relocation from the state of communication by HSDPA shown in FIG. 1.
Figure 7:
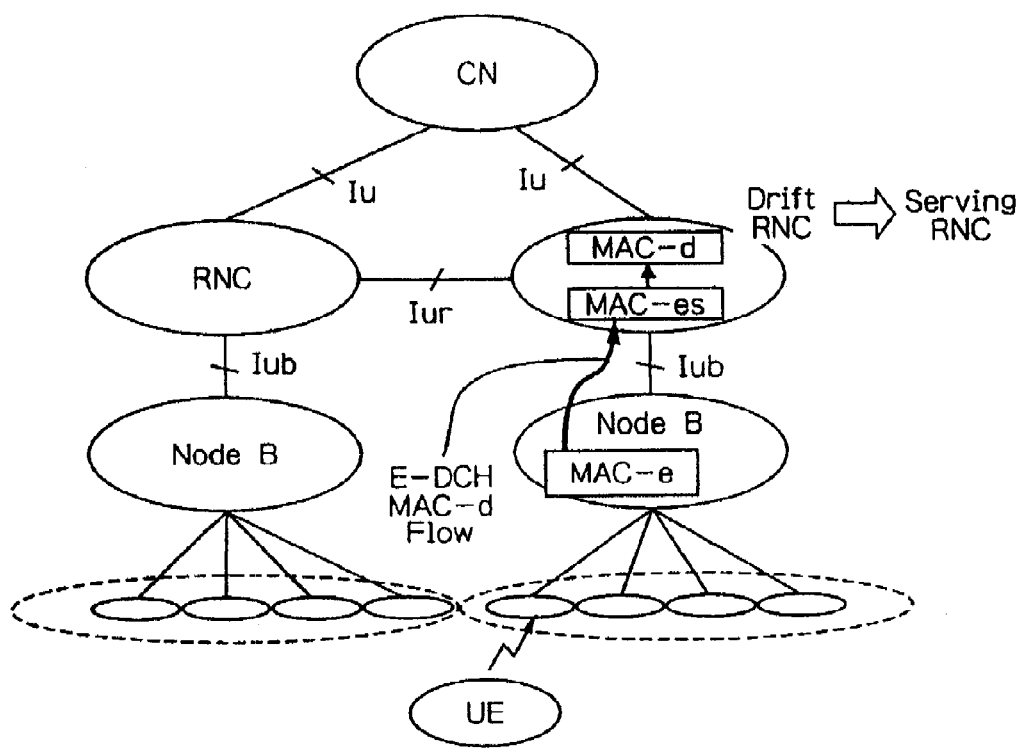
FIG. 7 shows data transfer following the implementation of relocation from the state of communication by an E-DCH shown in FIG. 3.
Figure 8:
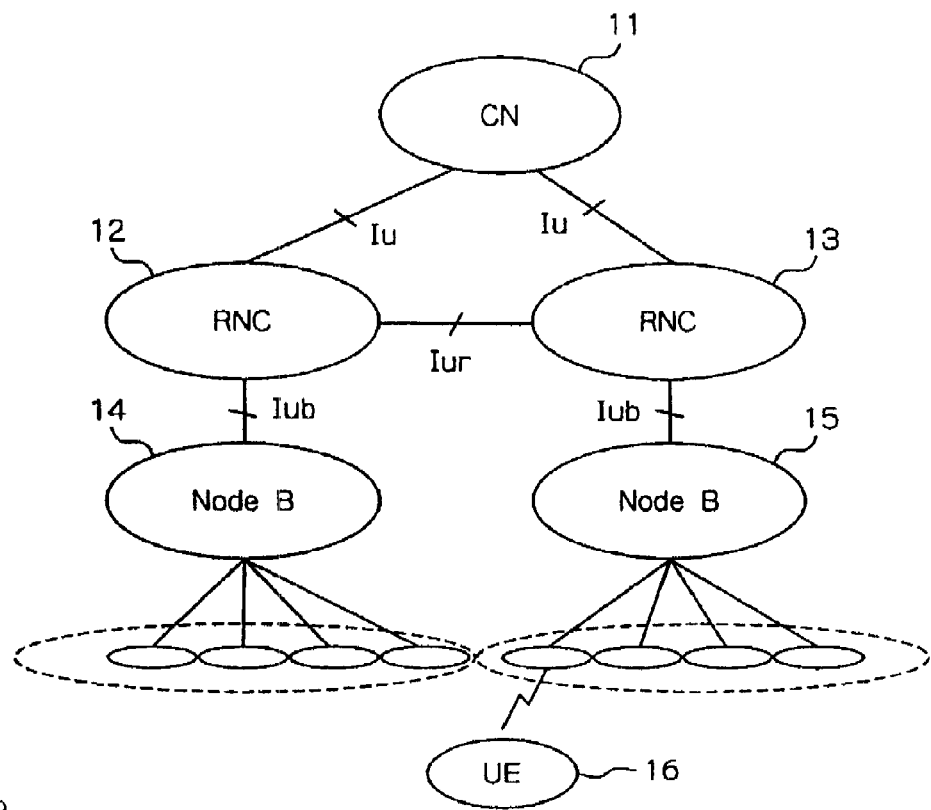
FIG. 8 is a block diagram showing the configuration of a mobile communication system according to an exemplary embodiment of the present invention.

FIG. 8 is a block diagram showing the configuration of a mobile communication system according to an exemplary embodiment of the present invention. Referring to FIG. 8, the mobile communication system of the present exemplary embodiment is a radio access network that includes a plurality of RNC 12 and 13 and a plurality of Node-B 14 and 15. RNC 12 and 13 are connected to CN 11. Node-B are connected under the RNC. In the example of FIG. 8, Node-B14 is connected under RNC 12, and Node-B 15 is connected under RNC 13. In addition, RNC 12 and RNC 13 are connected together. UE 16 enters a state in which communication is possible with RNC through the wireless connection wth Node-B in cells made up by Node-B. In this state, UE 16 transmits and receives control signals or data to and from RNC.

RNC 12 and 13 are connected to CN 11 and Node-B and control the radio access network. As one control of the radio access network, RNC 12 and 13 transmit and receive with UE 16 control signals of NAS or RRC protocol according to the SRB. RNC 12 and 13 further realize in their interiors a MAC-d entity and MAC-es entity and transmit and receive with UE 16 control signals and data.

RNC 12 and 13 can act as serving RNC or drift RNC according to the state of movement of UE 16. A serving RNC is the RNC that has charge of termination of the transmission and reception of UE control signals and data and that carries out protocol processing. A drift RNC transparently transfers, without terminating, the control signals and data between a serving RNC and a UE that has moved. In addition, RNC 12 and 13 can implement relocation from a state in which a drift RNC has been generated by the movement of UE 16. Node-B 14 and 15 are on one hand connected to RNC 12 and 13, and on the other hand, can connect to UE 16 wirelessly. The connection of Node-B 14 and 15 with UE 16 enables the communication of UE 16. Node-B 14 and 15 realize a MAC-e entity and MAC-hs entity in their interiors and carry out the relay of control signals and data that are transmitted and received between RNC and UE.

Figure 9:
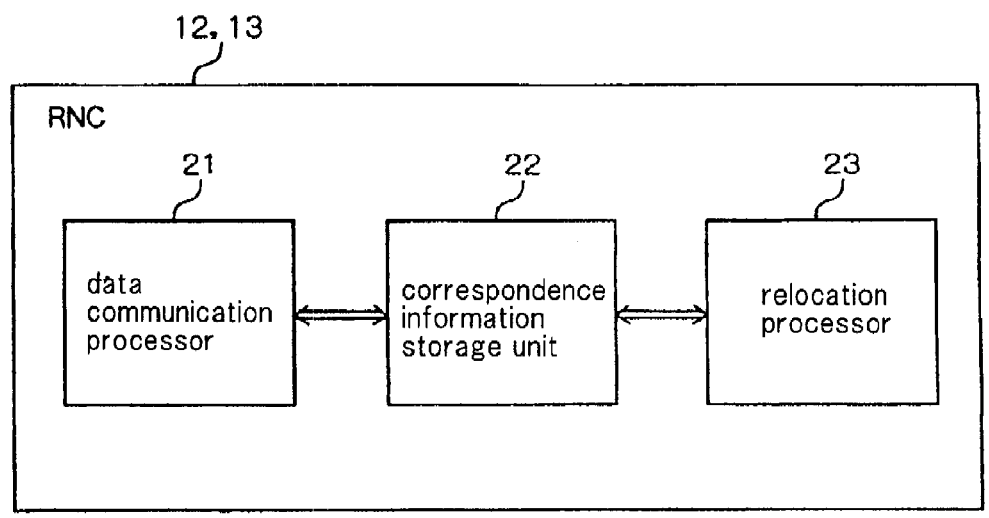
FIG. 9 is a block diagram showing the configuration of an RNC of the present exemplary embodiment.

FIG. 9 is a block diagram showing the configuration of an RNC of the present exemplary embodiment. Referring to FIG. 9, RNC 12 and 13 include data communication processor 21, correspondence information storage unit 22, and relocation processor 23.

Data communication processor 21 transmits control signals and data to UE 16 by downlink HS-DSCH MAC-d flow and receives control signals and data from UE 16 by uplink E-DCH MAC-d flow. At this time, data communication processor 21 refers to correspondence information that is stored in correspondence information storage unit 22 to recognize the correspondence relation between each SRB and each HS-DSCH MAC-d flow or each E-DCH MAC-d flow and transfers control signals and data in accordance with this correspondence relation.

Correspondence information storage unit 22 stores correspondence information that indicates the correspondence relation between each SRB and each HS-DSCH MAC-d flow or each E-DCH MAC-d flow. In the correspondence information, SRB IDs for identifying each SRB are placed in correspondence with HS-DSCH MAC-d flow IDs for identifying each HS-DSCH MAC-d flow or E-DCH MAC-d flow IDs for identifying each E-DCH MAC-d flow.

Figure 10:
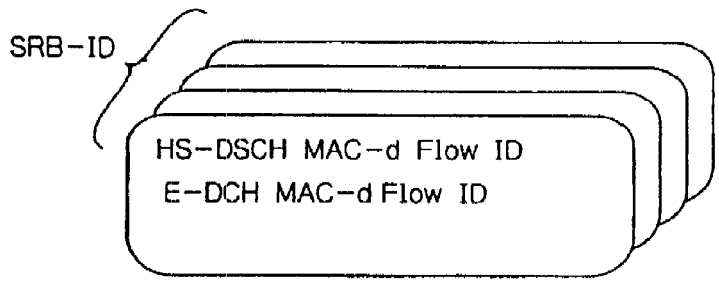
FIG. 10 shows an example of correspondence information of the present exemplary embodiment.

FIG. 10 shows an example of the correspondence information of the present exemplary embodiment. Referring to FIG. 10, the HS-DSCH MAC-d flow ID and E-DCH MAC-d flow ID that correspond to each SRB ID are recorded. In some cases, only one of HS-DSCH MAC-d flow ID and E-DCH MAC-d flow ID is recorded for an SRB ID, while in other cases, both are recorded.

When data communication processor 21 is to transmit, for example, a particular SRB to Node-B in a downward direction, data communication processor 21 multiplexes the SRB in the HS-DSCH MAC-d flow that is indicated by the HS-DSCH MAC-d flow ID that corresponds to the SRB ID of this SRB.

Alternatively, when data communication processor 21 is to, for example, separate an SRB from an E-DCH MAC-d flow received in an upward direction, data communication processor 21 separates the SRB from the E-DCH MAC-d flow indicated by the E-DCH MAC-d flow ID that corresponds to the SRB ID of that SRB.

Relocation processor 23 executes relocation under prescribed conditions when its own station acts as the serving RNC or drift RNC in a state in which a drift RNC is generated by the movement of UE 16. When its own station acts as the serving RNC, relocation processor 23 determines the execution of relocation in accordance with the prescribed conditions to request CN 11 to execute relocation and then carries out a series of processes. If its own station is the serving RNC in the course of this series of processes, relocation processor 23 reports the correspondence information stored in correspondence information storage unit 22 to the drift RNC.

When its own station acts as the drift RNC, relocation processor 23 receives a request from CN 11 and then carries out a series of processes. If its own station acts as the drift RNC in the course of this series of processes, relocation processor 23 stores the correspondence information that is reported from the serving RNC in correspondence information storage unit 22.

Figure 11:
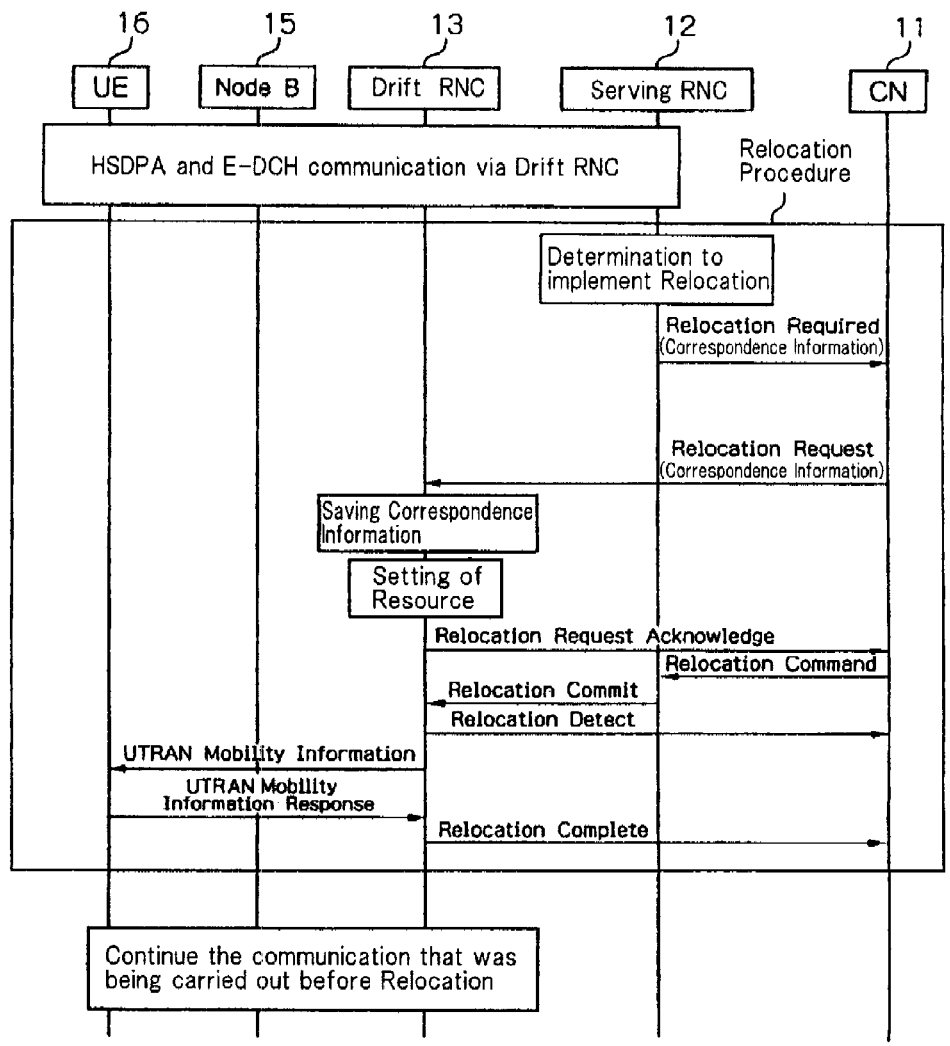
FIG. 11 is a sequence chart showing the operations of relocation in the mobile communication system of the present exemplary embodiment.

FIG. 11 is a sequence chart showing the operations of relocation in the mobile communication system of the present exemplary embodiment. In the example in FIG. 11, serving RNC 12 and UE 16 perform communication of HSDPA and E-DCH via drift RNC 13 as the initial state. At this time, the MAC-d entity in this communication is located in serving RNC 12.

From this state, serving RNC 12 determines to implement relocation in accordance with prescribed conditions. Relocation is carried out to optimize the path or to optimize the use of resources. In the relocation procedure, serving RNC 12 acts as source RNC, and drift RNC 13 acts as the target RNC.

Serving RNC (source RNC) 12 first transmits a "Relocation Required" message to CN 11. In this "Relocation Required" message, correspondence information stored in correspondence information storage unit 22 of serving RNC 12 is appended as an information element.

FIG. 12 is a chart showing an example of the definition of the information elements of the correspondence information. Referring to FIG. 12, the name of the information element of the correspondence information is "SRB TrCH Mapping." The maximum number of the groups of this information element "SRB TrCH Mapping" included in the control signal message is the number of SRB.

The SRB ID field is a prerequisite field in "SRB TrCH Mapping." As a result, an SRB ID field must be contained in the "SRB TrCH Mapping" information element. The HS-DSCH MAC-d flow ID field and E-DCH MAC-d flow ID field are optional. At least one of the HS-DSCH MAC-d flow ID and the E-DCH MAC-d flow ID is contained in the "SRB TrCH Mapping" information element. This correspondence information is not necessary in CN 11, and CN 11 transparently transfers this information to drift RNC 13.

CN 11, having received a "Relocation Required" message that contains correspondence information, transmits the "Relocation Request" message to drift RNC (Target RNC) 13. CN 11 reproduces the information element that is appended to the "Relocation Required" message in a "Relocation Request" message, and the correspondence information stored in correspondence information storage unit 22 of serving RNC 12 is therefore also added as information elements to the "Relocation Request" message.

Drift RNC 13, having received this "Relocation Request" message, records the correspondence information contained in the "Relocation Request" message in correspondence information storage unit 22 of its own station.

Next, based on this "Relocation Request" message, drift RNC 13 appropriates the radio resources and the resources on Iu interface, and after performing allocation, returns a "Relocation Request Acknowledgement" message to CN 11 indicating the completion of the appropriation of resources. CN 11, having received the "Relocation Request Acknowledgement" message, transmits a "Relocation Command" message to serving RNC 12 directing the execution of relocation.

Upon receiving the "Relocation Command" message from CN 11, serving RNC 12 transmits a "Relocation Commit" message to drift RNC 13. This "Relocation Commit" message is for notifying that the role as the serving RNC will transfer from the source RNC to the target RNC.

Drift RNC 13, having received the "Relocation Commit" message, both transmits to CN 11 a "Relocation Detect" message and transmits to UE 16 a "UTRAN Mobility Information" message. This "UTRAN Mobility Information" message is for notifying that the role of the serving RNC has been transferred by relocation.

When UE 16 that has received the "UTRAN Mobility Information" message returns a "UTRAN Mobility Information Response" message to drift RNC (new serving RNC) 13, RNC 13 returns a "Relocation Complete" message to CN 11.

When relocation has been completed by the procedure of the above-described example, RNC 13, which had acted as a drift RNC, acts as a serving RNC and enters a state in which communication with UE 16 is possible.

In addition, correspondence information that was in correspondence information storage unit 22 of serving RNC 12 is communicated to drift RNC (new serving RNC) 13, and this information is recorded in correspondence information storage unit 22 of new serving RNC 13. As a result, after relocation, RNC 13 can continue the communication with UE 16 that was being carried out by RNC 12 before relocation.

An example has here been shown in which relocation is implemented from a state in which both HSDPA and E-DCH are being carried out, but implementation is also possible from a state in which only one of the two is being carried out.

As described hereinabove, according to the present exemplary embodiment, when the implementation of relocation causes the role of the serving RNC to transfer to the drift RNC during data communication, the correspondence information that was maintained by the serving RNC during the series of procedures is reported to the drift RNC and recorded in the drift RNC, whereby data communication that was being carried out before relocation can be continued even after the completion of relocation.

In addition, although an example was described in the present exemplary embodiment in which relocation is carried out from a state in which CN 11 and UE 16 are using both HSDPA and E-DCH to communicate, the present invention is not limited to this form. As another example, relocation may be carried out from a state in which only HSDPA is used to transfer data from CN 11 to UE 16. Alternatively, relocation may also be carried out from a state in which only E-DCH is used to transfer data from UE 16 to CN 11. In the correspondence information shown in FIG. 10, only one of HS-DSCH MAC-d flow ID and E-DCH MAC-d flow ID may be recorded in correspondence with the SRB ID. Alternatively, in the chart shown in FIG. 10, HS-DSCH MAC-d flow ID and E-DCH MAC-d flow ID may be options and both need not be simultaneously contained in SRB TrCH Mapping.

In the present exemplary embodiment, an example was shown in which the present invention is applied to 3GPP, but the present invention is not limited to this form. The present invention can be widely applied in mobile communication systems that allow the role of serving RNC to be transferred to the drift RNC by relocation when a drift RNC is generated by movement of a UE.

As another exemplary embodiment of the present invention, an example is shown in which the present invention is applied to a mobile communication system having a configuration in which CN is not interposed in relocation. The configuration of the mobile communication system in this other exemplary embodiment is similar to the system shown in FIG. 8. In addition, the configuration of an RNC in this other exemplary embodiment is also similar to the configuration shown in FIG. 9.

Figure 13:
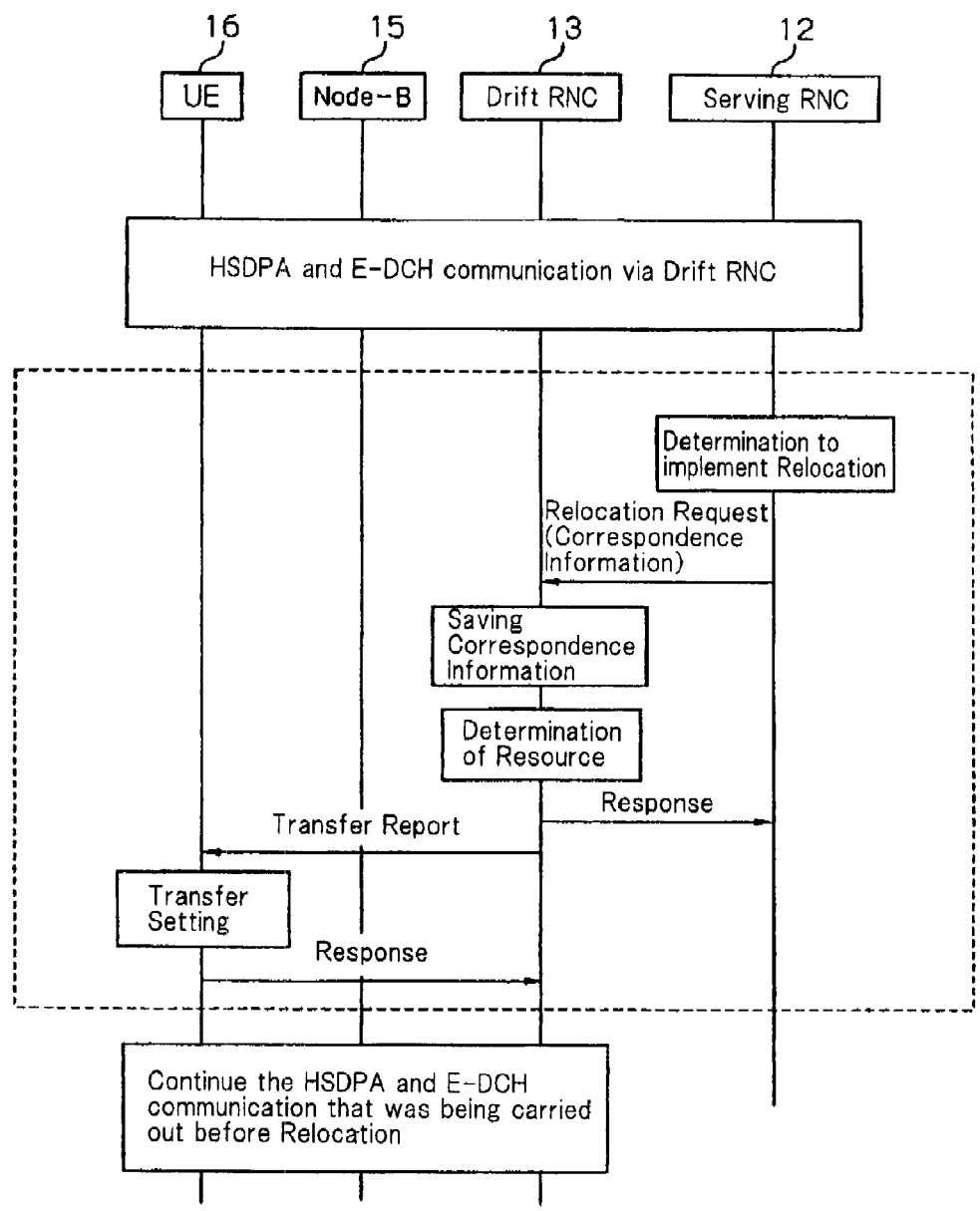
FIG. 13 is a sequence chart showing the operation of relocation in the mobile communication system of another exemplary embodiment.

FIG. 13 is a sequence chart showing the relocation operation in the mobile communication system of this other exemplary embodiment. As the initial state in the example of FIG. 13, serving RNC 12 and UE 16 are engaged in HSDPA and E-DCH communication via drift RNC 13. In this communication at this time, serving RNC 12 takes charge of termination of the communication with UE 16 and drift RNC 13 transparently relays the data.

From this state, serving RNC 12 determines to implement relocation in accordance with prescribed conditions.

Serving RNC 12 first transmits a relocation request message to drift RNC 13. This relocation request message contains correspondence information that is stored in correspondence information storage unit 22 of serving RNC 12.

Upon receiving the relocation request message that contains the correspondence information, drift RNC 13 records the correspondence information contained in the message in correspondence information storage unit 22 of its own station.

Based on this message, drift RNC 13 next appropriates various resources and performs allocation, and then both returns a response to serving RNC 12 and transmits a transfer report message to UE 16. This transfer report message is for reporting that the role of serving RNC has been transferred by relocation.

UE 16, having received the transfer report message, makes allocations for the transfer of the serving RNC and then returns a response to drift RNC (new serving RNC) 13.

When relocation has been completed by the procedure of the above-described example, RNC 13, which had acted as the drift RNC, acts as the serving RNC, and thus enters a state in which communication with UE 16 is possible.

The correspondence information that was in correspondence information storage unit 22 of serving RNC 12 is reported to drift RNC (new serving RNC) 13 and this information is recorded in correspondence information storage unit 22 of new serving RNC 13. As a result, even after relocation, RNC 13 is able to continue the communication with UE 16 that was being carried out by RNC 12 before relocation.

In each of the above-described exemplary embodiments, examples were described in which correspondence information is appended to the message that requests relocation and then transmitted, but the present invention is not limited to this form. As another example, the correspondence information may be transmitted separately from the relocation request.

It was further assumed that in the operations of each of the above-described exemplary embodiments, the drift RNC returned a response to the source of the request of relocation after allocating resources. However, the present invention is not limited to this form, a response not being necessary in the present invention. As another example of operations, the source of the request may recognize by the passage of a prescribed time interval that the allocation of resources in the drift RNC has been completed.

In addition, in the operations of each of the above-described exemplary embodiments, examples were described in which the UE, having received a report of transfer from the drift RNC (new serving RNC), responded to that RNC. However, the present invention is not limited to this form, and in the present invention, this response is not mandatory. As another example of the operations, the drift RNC may recognize by the passage of a prescribed time interval that the allocations for a transfer have been completed in the UE.

The invention claimed is:

1. A mobile communication system comprising:
a radio terminal;
a radio base station;
a serving base station controller that transmits a control signal to the radio terminal by using a Signaling Radio Bearer; and
a drift base station controller that relays data communication between the serving base station controller and the radio terminal;
wherein, during a relocation procedure, a first ID for identifying the Signaling Radio Bearer and a second ID for identifying a High-Speed Downlink Shared Channel (HSDSCH) Medium Access Control (MAC)-d flow and a third ID for identifying an Enhanced Dedicated Channel (E-DCH) MAC-d flow are transmitted from the serving base station controller to the drift base station controller, and wherein the first ID is mapped with the second ID and the third ID.

2. A drift base station controller of a mobile communication system in which a serving base station controller transmits a control signal to a radio terminal by using a Signaling Radio Bearer, the drift base station controller comprising:
a relay unit that relays data communication between the serving base station controller and the radio terminal; and
a receiver that receives from the serving base station controller, during a relocation procedure, a first ID for identifying the Signaling Radio Bearer, a second ID for identifying a High-Speed Downlink Shared Channel (HS-DSCH) Medium Access Control (MAC)-d flow and a third ID for identifying an Enhanced Dedicated Channel (E-DCH) MAC-d flow, wherein in the first ID is mapped with the second ID and the third ID.

3. A serving base station controller for carrying out data communication with a radio terminal via a drift base station controller, the serving base station controller comprising:
a first transmitter that transmits a control signal to the radio terminal by using a Signaling Radio Bearer; and
a second transmitter that transmits to the drift base station controller, during a relocation procedure, a first ID for identifying the Signaling Radio Bearer and a second ID for identifying a High-Speed Downlink Shared Channel (HS-DSCH) Medium Access Control (MAC)-d flow and a third ID for identifying an Enhanced Dedicated Channel (E-DCH) MAC-d flow, wherein the first ID is mapped with the second ID and the third ID.

4. A radio terminal comprising:
a receiver that receives a control signal that is transmitted from a serving base station controller by using a Signaling Radio Bearer; and
a communication unit that performs data communication with the drift base station controller after a first ID for identifying the Signaling Radio Bearer and a second ID for identifying a High-Speed Downlink Shared Channel (HS-DSCH) Medium Access Control (MAC)-d flow and a third ID for identifying an Enhanced Dedicated Channel (E-DCH) MAC-d flow are transmitted from the serving base station controller to the drift base station controller during a relocation procedure, wherein the first ID is mapped with the second ID and the third ID.

5. A core network that is connected to a serving base station controller that transmits a control signal to a radio terminal by using a Signaling Radio Bearer and is connected to a drift base station controller that relays data communication between the serving base station controller and the radio terminal, the core network comprising:
a receiver that receives from the serving base station controller, during a relocation procedure, a first ID for identifying the Signaling Radio Bearer and a second ID for identifying a High-Speed Downlink Shared Channel (HS-DSCH) Medium Access Control (MAC)-d flow and a third ID for identifying an Enhanced Dedicated Channel (E-DCH) MAC-d flow; and
a transmitter that transmits to the drift base station controller, the first ID, the second ID and the third ID, wherein the first ID is mapped with the second ID and the third ID.

6. A control method of a radio terminal in a mobile communication system that includes a serving base station controller and a drift base station controller, the method comprising:

receiving a control signal from the serving base station controller by using a Signaling Radio Bearer;

performing during a relocation procedure, data communication with the drift base station controller after a first ID for identifying the Signaling Radio Bearer, a second ID for identifying a High-Speed Downlink Shared Channel (HS-DSCH) Medium Access Control (MAC)-d flow and a third ID for identifying an Enhanced Dedicated Channel (E-DCH) MAC-d flow are transmitted from the serving base station controller to the drift base station controller, wherein the first ID is mapped with the second ID and the third ID.

7. The method according to claim 6, wherein the data communication with the drift base station controller is performed without performing data communication with the serving base station controller.

8. A relocation method wherein:

a serving base station controller transmits a control signal to the radio terminal by using a Signaling Radio Bearer;

a serving base station controller performs data communication with radio terminal via the drift base station controller; and during a relocation procedure, the serving base station controller transmits to the drift base station controller a first ID for identifying the Signaling Radio Bearer and a second ID for identifying a High-Speed Downlink Shared Channel (HS-DSCH) Medium Access Control (MAC)-d flow and a third ID for identifying an Enhanced Dedicated Channel (E-DCH) MAC-d flow, wherein the first ID is mapped with the second ID and the third ID.

* * * * *

UNITED STATES PATENT AND TRADEMARK OFFICE
CERTIFICATE OF CORRECTION

| | | |
|---|---|---|
| PATENT NO. | : 9,137,721 B2 | Page 1 of 1 |
| APPLICATION NO. | : 14/107433 | |
| DATED | : September 15, 2015 | |
| INVENTOR(S) | : Sadafuku Hayashi | |

It is certified that error appears in the above-identified patent and that said Letters Patent is hereby corrected as shown below:

ON THE TITLE PAGE

Item 63, Related U.S. Application Data: delete "Continuation of Application No. 13/340,878, filed on Dec. 30, 2011, now Pat. No. 8,670,370, which is a continuation of application No. 12/278,527, filed on Aug. 6, 2008, now Pat. No. 8,422,456." and insert -- Continuation of Application No. 13/340,878, filed on Dec. 30, 2011, now Pat. No. 8,670,370, which is a continuation of application No. 12/278,527, filed on Aug. 6, 2008, now Pat. No. 8,422,456, which is a 371 of PCT/JP2007/050222 filed Jan. 11, 2007. --

Signed and Sealed this
Sixteenth Day of February, 2016

Michelle K. Lee
*Director of the United States Patent and Trademark Office*